(12) United States Patent
McCombs et al.

(10) Patent No.: US 6,212,957 B1
(45) Date of Patent: Apr. 10, 2001

(54) FLUID FLOWMETER AND METHOD OF ASSEMBLY

(75) Inventors: Norman R. McCombs, Tonawanda; James A. Alessi, Leroy, both of NY (US)

(73) Assignee: AirSep Corporation, Buffalo, NY (US)

( * ) Notice: Subject to any disclaimer, the term of this patent is extended or adjusted under 35 U.S.C. 154(b) by 0 days.

(21) Appl. No.: 09/179,502

(22) Filed: Oct. 27, 1998

(51) Int. Cl.[7] .................................................. G01F 1/22
(52) U.S. Cl. ................................... 73/861.55; 73/1.33
(58) Field of Search ................................. 73/1.18, 1.33, 73/861.55, 861.56, 861.57, 861.58, 239, 305, 323

(56) References Cited

U.S. PATENT DOCUMENTS

| | | |
|---|---|---|
| 3,785,205 | 1/1974 | Lambert et al. . |
| 3,933,040 | 1/1976 | Thompson . |
| 4,302,980 * | 12/1981 | Braatz .............................. 73/861.55 |
| 4,317,375 | 3/1982 | Egert . |
| 4,934,187 * | 6/1990 | Woltman ........................... 73/861.57 |
| 5,402,686 * | 4/1995 | Wittmann .......................... 73/861.55 |

* cited by examiner

Primary Examiner—Harshad Patel
(74) Attorney, Agent, or Firm—Jaeckle Fleischmann & Mugel, LLP

(57) ABSTRACT

A ball type flowmeter having an external transparent housing on which a flow rate scale is pre-printed, and contained in the housing is a transparent tube having a floating ball, the tube being slidable in the housing and having upper and lower flanges to be moved into and then fixed at a position at which the ball indicates the flow rate of a test gas.

5 Claims, 4 Drawing Sheets

US 6,212,957 B1

FLUID FLOWMETER AND METHOD OF ASSEMBLY

FIELD OF THE INVENTION

This invention relates generally to measuring devices to measure the flow rate(s) of fluids in confined flow paths, and more particularly to floating ball type static flowmeters in which the rate of flow of the fluid causes a floating ball in the fluid path to be positioned against a scale which indicates the fluid flow rate.

BACKGROUND OF THE INVENTION

Typically, a floating ball type static flowmeter, such as that used to measure the flow rate of a gas passing through fluid conduits or tubing from a gas supply source to a gas user device, includes in the fluid path a transparent, vertically positioned tube through which the gas from the source is passed before transmission to the users device. A ball, usually spherical in shape, is positioned in the tube to rise and fall depending on the pressure applied to the ball as determined by the flow rate of the gas passing through the tube. A visual scale may be etched or printed along the barrel of the tube or a transparent housing enclosing the tube, the scale indicating the flow rate of the gas, e.g., in liters per minute (lpm), by the position of the ball against the scale.

Although simple in concept, the construction and assembly of such flowmeters can be complex and/or expensive if accuracy in flow rate measurement is needed. To provide relative accuracy, the flowmeters often are individually tested after assembly and the measuring scale added to the barrel of the tube or housing corresponding to the position of the ball after a test gas is passed though the tube at known flow rates from a minimum flow rate, e.g., 1 lpm, to a maximum flow rate, e.g., 15 lpm. Moreover, as uses of specific gases, such as oxygen or a concentrated oxygen mixture, in medical applications become more commonplace to permit patient mobility, factors such as cost, weight and simplification of design and assembly become more important considerations. For these and other purposes, we have developed an improved flowmeter that retains the simplicity of a ball-type flowmeter, but is more efficient and less costly to assemble. Because the flowmeter design according to our invention is very flexible, it also is possible to produce flowmeters of different capacities with a minimum of changes in parts.

SUMMARY OF THE INVENTION

The present invention comprises a ball type flowmeter having an external transparent housing on which the flow rate scale is pre-printed before assembly. Within the housing is a transparent tube containing a floating ball and through which the gas is passed, the tube being slidable in the housing and having upper and lower flanges to hold the tube in a vertical position in the housing. A source gas is then introduced into the tube by opening a valve at the inlet of the flowmeter until the gas flows through the tube at a predetermined flow rate, e.g., 5 lpm, as measured by an accurate, external flow rate instrument. The tube is then slidably moved within the housing until the ball is positioned immediately adjacent to the corresponding numeral on the pre-printed scale and the tube then fixed to the housing at that position.

BRIEF DESCRIPTION OF THE DRAWING FIGURES

The invention and its features and advantages will be more apparent from the following description of a preferred embodiment of the invention and the accompanying drawings, in which like numerals represent like parts, and in which.

Figure 1:
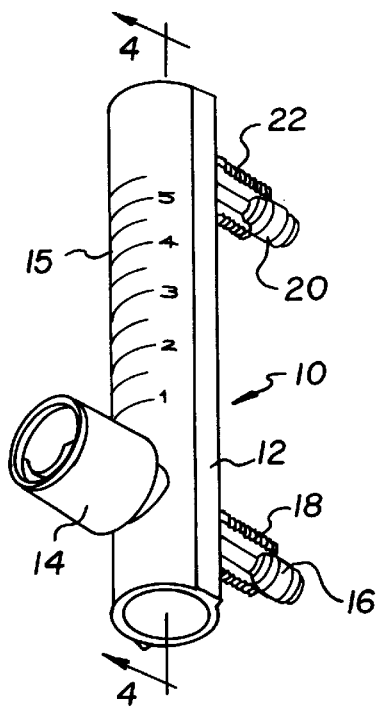
FIG. 1 is a perspective view of a preferred embodiment of a flowmeter according to the invention, as seen from the bottom and front of the flowmeter.
Figure 4:
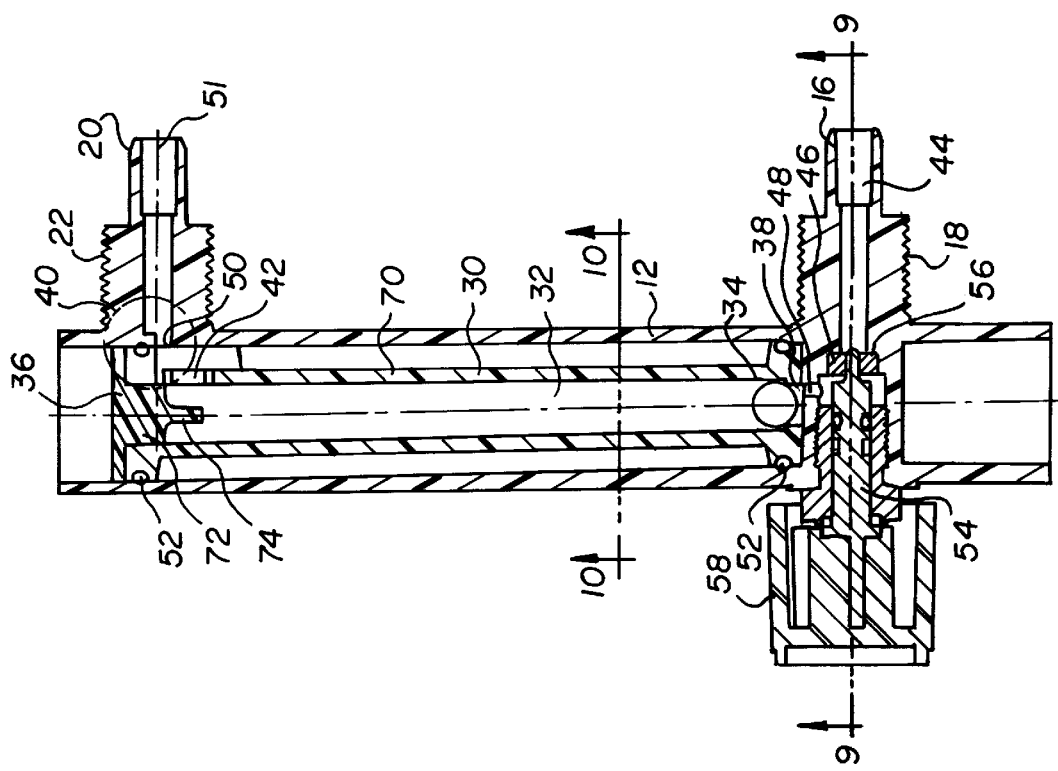
FIG. 4 is a cross-sectional view of the flowmeter, taken on line 4—4 of FIG. 1.
Figure 7A:
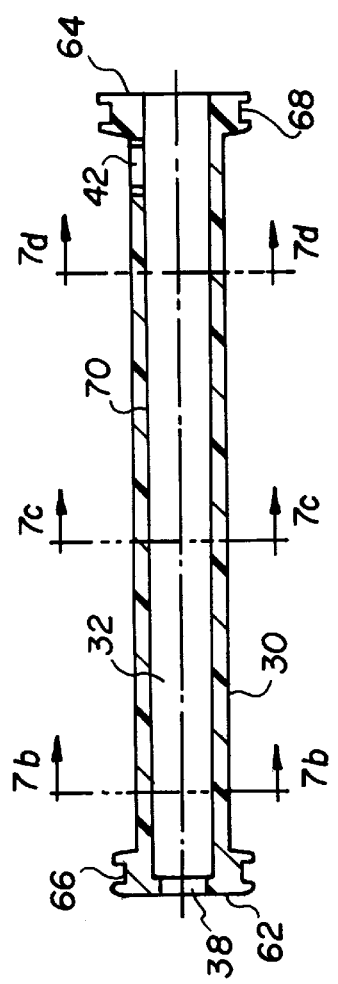
FIG. 7a is a longitudinal cross-sectional view of the flow tube, taken on line 7a—7a of FIG. 6.
Figure 7D:
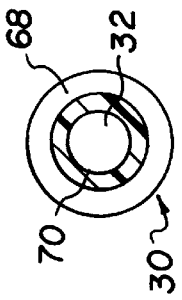
Figure 7C:
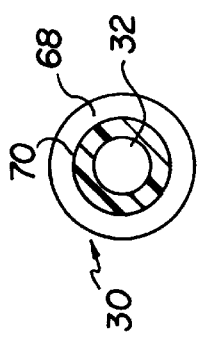
Figure 6:
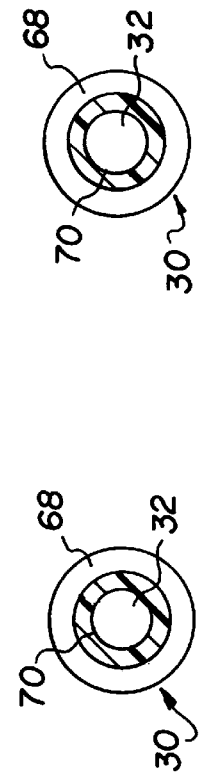
FIG. 6 is a perspective view of the flow tube according to the preferred embodiment.
Figure 7B:
Figure 8:
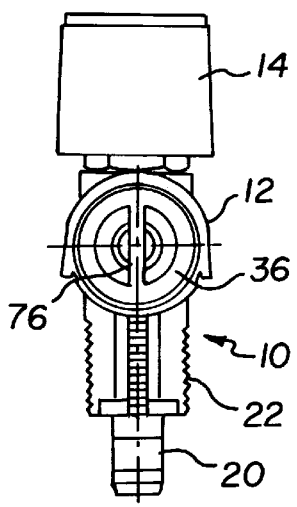
Figure 9:
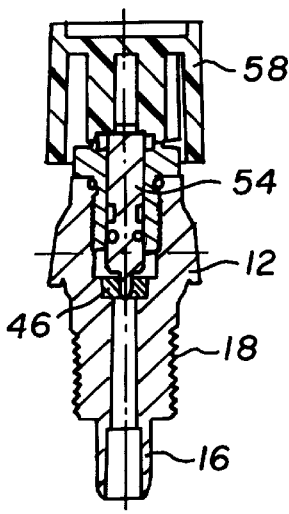
Figure 10:
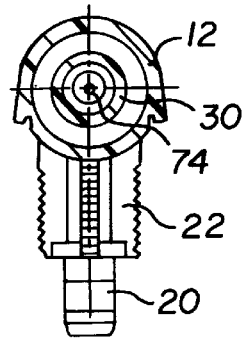
Figure 11:
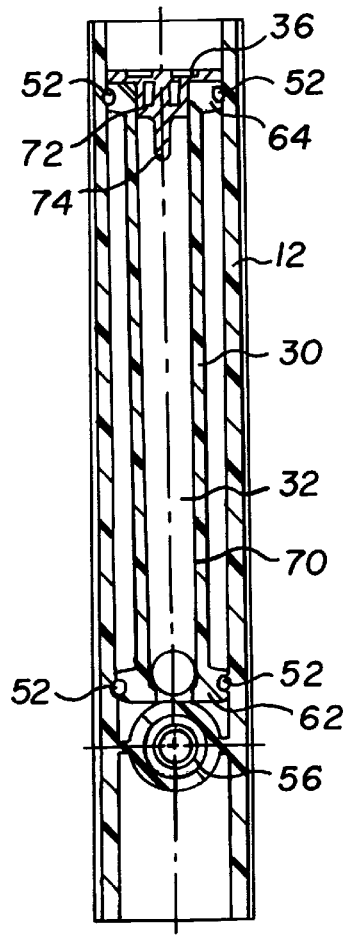
Figure 12A:
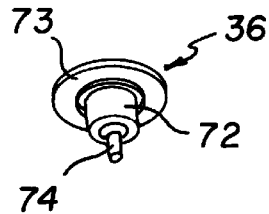
Figure 12B:
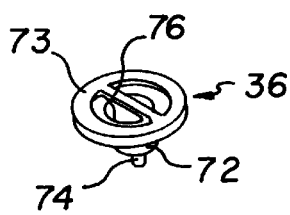

FIGS. 7b through 7d are transverse cross-sectional views of the flow tube, taken on lines 7b—7b through 7d—7d of FIG. 7a;

FIG. 8 is a top view of the preferred embodiment of FIG. 1;

FIG. 9 is a transverse cross-sectional view of the housing and valve assembly, taken on line 9—9 of FIG. 4;

FIG. 10 is a further transverse cross-sectional view of the preferred embodiment, taken on line 10—10 on FIG. 4;

FIG. 11 is a simplified cross-sectional view of the housing and flow tube to illustrate the method for positioning the flow tube; and FIGS. 12a and 12b are perspective views of the end cap used to locate and fix the position of the flow tube.

DETAILED DESCRIPTION OF EMBODIMENTS

Figure 3:
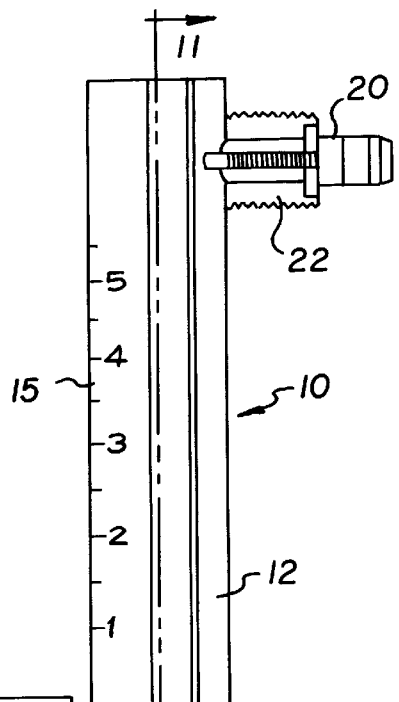
FIG. 3 is a side view of the flowmeter of FIG. 1.
Figure 2:
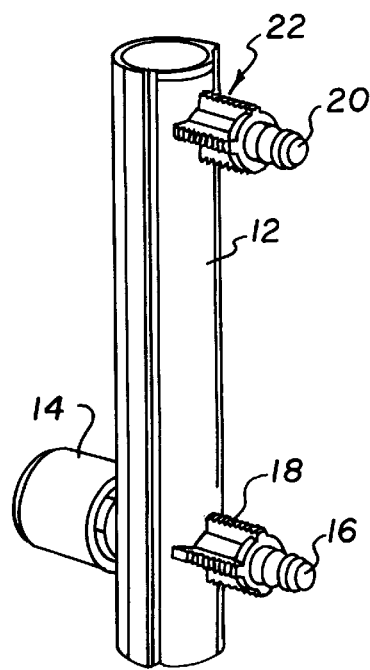
FIG. 2 is another perspective view of the flowmeter of FIG. 1, as seen from the top and back of the flowmeter.

Turning now to the drawings and considering first FIGS. 1 through 3, there is shown a preferred embodiment of a gas flowmeter, generally indicated as 10, according to the invention. Flowmeter 10 includes an external housing 12 of a dimensionally stable transparent material such as a performance plastic (LEXAN™ or the like). The flow of gas, such as oxygen or a concentrated oxygen mixture, through flowmeter 10 is controlled by a valve 14, the flow rate of the gas being measured by a scale 15 printed on or etched into the housing 12. Gas from a source (not shown) is introduced to the flowmeter 10 through an inlet 16, to which is connected a suitable gas supply tubing having a threaded coupling attachable to screw threads 18 integrally molded with housing 12 along with inlet 16. The gas then is transmitted through the flowmeter 10 to an outlet 20, to which is attached a suitable gas user device, such as a nose cannula (not shown), also by suitable tubing (not shown) coupled to outlet 20 by integrally molded screw threads 22.

Referring now to FIG. 4, there is contained within housing 12 a transparent flow tube 30 of generally cylindrical shape, as will be discussed, and forming a central passageway 32 through which the user gas is passed from inlet 16 to outlet 20. Contained within passageway 32 is a float ball 34, preferably an opaque spherical glass ball. Enclosing the top end of flow tube 30 at its exit end is an end cap 36, which will be described in more detail.

Formed within the bottom end of tube 30 is a gas inlet opening 38 that enables the gas introduced through valve 14 to be received into central passageway 32. As generally indicated by the circled area 40, the gas then exits the flow tube 30 by an aperture 42 contained in the side wall of tube 30, from which the oxygen or gas flows through an aperture 50 in housing 12 (see also FIG. 5) to an opening 51 in outlet 20.

Figure 5:
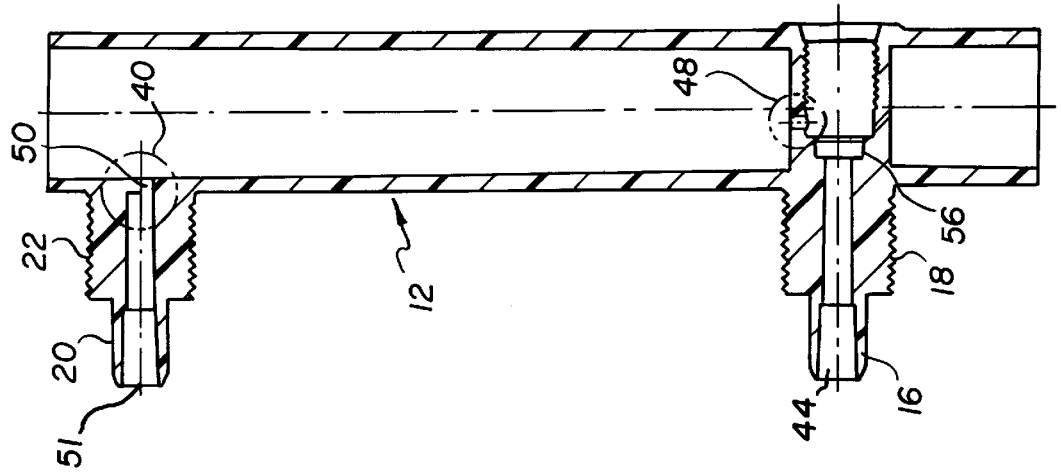
FIG. 5 is a cross-sectional view of the housing of the preferred embodiment, as viewed from the side opposite to that of FIG. 4.

As seen in FIG. 5, the housing 12 comprises, along with the inlet 16 and outlet 20, an integrally formed valve seat 56. The supplied gas will flow through a central opening 44 of inlet 16 and through an aperture 48 formed in housing 12 and in fluid connection with the bottom opening 38 of tube 30 as shown in FIG. 4. Control of the rate of flow is accomplished by a valve stem subassembly 54 positioned in the valve seat 56 and having at its bottom end a seal 46 to shut off the fluid connection when the valve is closed. When opened, valve stem 54 will permit the gas to pass through inlet opening 44 and through openings 48 and 38 into tube 30. The valve seat 56 and stem subassembly 54, to which is attached handle 58, are constructed in a manner known in the art.

According to the invention, tube 30 includes a pair of end flanges 62, 64 of substantially equal dimension, which together with a pair of O-rings 52 mounted in corresponding grooves 66, 68 of flanges 62, 64 hold tube 30 within housing 12 and create a fluid seal between the tube 30 and the barrel of housing 12. The central open core of housing 12 has a substantially constant diameter in order for the seal to be maintained regardless of the position of tube 30 within housing 12. A central portion 70 of tube 30, which defines passageway 32, preferably has a uniform wall thickness throughout the length of portion 70, but is tapered from a narrower inner diameter at its lower inlet end to a wider inner diameter at its upper outlet end, as shown for example in FIGS. 7b, 7c, and 7d. By this principle, the gas flowing through tube 30, depending on its flow rate, will cause the ball 34 to rise to an equilibrium point within the passageway 32, at which position, ball 34 can be viewed against scale 15 to measure the flow rate.

The internal diameter of the flowmeter tube 30, the size of the float ball 34, and the inlet, outlet openings 38, 42 will vary in dimension according to the size and capacity of flowmeter 10. In the example embodiment shown, the diameter of passageway 32 at FIG. 7a is about 0.259 inches to approximate a gas flow rate of about 1 liter per minute, the diameter at FIG. 7b, about 0.271 inches to approximate about 3 lpm, and the diameter at FIG. 7c about 0.215 inches to approximate about 5 lpm flow rate. However, as now can be seen, it is possible to produce flowmeters with different flow ranges merely by changing the outer and inner diameters of the central portion 70 of tube 30 and appropriately sizing both the two openings 38 and 42 of tube 30 and the diameter of float ball 34, but without changing the dimensions of either of the flanges 62, 64 in order to retain the fluid seal with housing 12. Except for the printing of different scale ranges on housing 12, substantially all of the remaining parts of flowmeter 10 can be used interchangeably for flowmeters of differing ranges of measurement. Moreover, by producing tube 30 with the central portion 70 having a substantially uniform wall thickness, tube 30 can now be produced from a performance plastic by injection molding and still provide the accurate passageway dimensions required for flowmeters.

According to the invention, the flowmeter 10 includes an end cap 36 which consists of a circular aperture plug 72 fitting within tube 30 and molded together with an annular closure disk 73 sealed to the top of tube 30, either by a weld or adhesive, in order to close the top end of passageway 32. The end cap 36 may also contain a stem 74 to prevent ball 34 from blocking the exit opening 42 at a high flow rate.

At the time of manufacturing housing 12, the flow rate scale 15 may also be molded in and/or etched or printed on its barrel before final assembly. The valve stem subassembly 54 and handle 58 are then attached to the housing 12.

As a separate subassembly, O-rings 52 are attached to their respective flanges 62, 64, the ball 34 placed within the passageway 32 of housing 30, and the end cap 36 sealed in position to enclose ball 34 in passageway 32.

For its final assembly, the tube subassembly is then inserted into housing 12 from its top and slid into a position proximate to the housing openings 48 and 50. The flowmeter 10, with valve 14 closed, is then attached to a known gas supply source an accurate flow measuring instrument. With the flowmeter 10 then held in its normal vertical position, valve 14 is opened until the flow measuring instrument of the supply source indicates a particular flow rate, for example 3 liters per minute. When that flow rate is stabilized and ball 34 floats within passageway 32 in its equilibrium position for that flow rate, tube 30 is grasped by a handle 76 on the end cap 36 and the tube 30 slidably moved within housing 12 until ball 34 is positioned immediately opposite the corresponding reading, in this case the numeral "3" on scale 15. With tube 30 at that position, end cap 36 is then welded or fixed by an adhesive along its rim to the inner wall of housing 12, to thereby fix the position of tube 30.

As therefore can be seen, it is clear that the manufacture of the flowmeter parts and its assembly according to the invention can readily be accomplished in different flow ranges, can take into account small variations in manufacturing processes, and can enable easy assembly, without resorting to time consuming and relatively costly post-assembly scale printing on the housing of each flowmeter.

Although the present description is described for the production of a flowmeter to be used with an oxygen product gas, it is apparent that skilled practitioners could use the flowmeter and its method of assembly for other fluids as well. It also will be understood that numerous modifications and substitutions may be made to the described embodiments without departing from the spirit of the invention as claimed.

We claim:

1. An improved static floating ball type fluid flowmeter comprising a fluid flow inlet and a fluid flow outlet, a vertical annular housing with an inner annular interior wall defining a central opening and having a transparent portion containing a flow rate scale with indexes thereon for indicating various rates of flow of a fluid passing through the flowmeter, a tube having a transparent central portion defining a passageway through which the fluid is passed, the tube positioned within the housing and comprising integral upper and lower flanges for engaging the housing, the flanges dimensioned to enable the tube to be frictionally and slidably held temporarily in the central opening of the housing, a floating ball positioned within the central passageway of the tube to float within the passageway in a position determined by pressure applied to the ball by a predetermined rate of flow of the fluid passing through the passageway, means for slidably moving the tube within the housing to a position at which the ball is immediately adjacent to the corresponding index on the pre-printed scale that indicates the predetermined flow rate and means for fixing the tube at that position.

2. An improved fluid flowmeter according to claim 1, in which the upper and lower flanges include means for preventing the fluid from flowing between the housing and the tube.

3. An improved fluid flowmeter according to claim 1, in which the passageway in the tube has two ends, and the moving means comprises a cap fixed to the tube and sealing one of the two ends.

4. An improved fluid flowmeter according to claim 1, in which the central portion of the tube and comprises a cylinder wall of substantially uniform thickness, the cylinder wall having two ends and an inner diameter defining the passageway, the wall being tapered such that the inner diameter has a dimension at one end which is different from the dimension at the other end.

5. A method of assembling a floating ball type static fluid flowmeter to measure the rate of flow of a fluid passing through the flowmeter, the method comprising the steps of (a) pre-printing a flow rate scale onto a transparent housing having an inner wall defining a central opening, the scale having indices for indicating various rates of flow of fluid to be passed through the flow meter, (b) placing in the central opening of the housing a transparent tube having upper and lower flanges with both flanges frictionally engaging the inner wall of the housing and permitting slidable movement of the tube within the central opening of the housing the tube having a passageway containing a floatable ball and fluidically connecting a lower fluid inlet opening and an upper fluid outlet opening, (c) holding the housing and tube with the tube passageway in a position with the fluid inlet positioned below the fluid outlet in the housing, and introducing a flow of fluid to pass through the tube passageway from the fluid inlet to the fluid outlet at a predetermined flow rate to cause the ball to float within the tube, (d) slidably moving the tube within the central opening of the housing until the tube is in a position at which the ball is immediately adjacent to the corresponding index on the pre-printed scale that indicates the predetermined flow rate, and (e) fixing the flanges of the tube to the housing at that position to fix the position of the tube within the housing.

* * * * *